United States Patent [19]
Libby et al.

[11] Patent Number: 5,987,520
[45] Date of Patent: Nov. 16, 1999

[54] CLOSED USER GROUP PREPROCESSING DECISION FOR EFFICIENT CALL SECURITY VALIDATION

[75] Inventors: Mark G. Libby, S. Chelmsford; Ronald M. Parker, Acton, both of Mass.

[73] Assignee: Ascend Communications, Inc., Westford, Mass.

[21] Appl. No.: 09/008,224

[22] Filed: Jan. 16, 1998

Related U.S. Application Data

[60] Provisional application No. 60/059,267, Sep. 18, 1997.

[51] Int. Cl.$^6$ .............................. G06F 13/00; H04M 3/42
[52] U.S. Cl. .......................... 709/238; 709/222; 709/249
[58] Field of Search .................................... 709/201, 202, 709/220, 221, 222, 223, 224, 225, 238, 242, 243, 249; 713/201; 379/207, 219, 220, 229; 370/396, 398, 400

[56] References Cited

U.S. PATENT DOCUMENTS

| | | | |
|---|---|---|---|
| 4,897,874 | 1/1990 | Lidinsky et al. | 380/3 |
| 5,422,940 | 6/1995 | Endo et al. | 379/207 |
| 5,511,116 | 4/1996 | Shastry et al. | 379/201 |
| 5,512,885 | 4/1996 | Agestam et al. | 340/825.52 |
| 5,574,904 | 11/1996 | Yunoki et al. | 707/1 |
| 5,646,985 | 7/1997 | Andruska et al. | 379/207 |

OTHER PUBLICATIONS

"Topaz Closed User Groups Function Specification", Cascade Communications Corp., Jul. 1996, pp. 1–40.

*Primary Examiner*—Viet D. Vu
*Attorney, Agent, or Firm*—Weingarten, Schurgin, Gagnebin & Hayes LLP

[57] ABSTRACT

A network node preprocesses Closed User Group (CUG) member rules and network configuration information available to the node during a configuration phase of the network preceding an operational phase in which calls are placed among the users. The preprocessing stores the information about the CUG membership of network users into a preprocessed CUG information table directly associated with user addresses. CUG membership of some attached users is ambiguous at configuration time if there exists a CUG member rule that is more specific than a prefix configured on the node with which the addresses of such users begin. For such users, CUG membership is determined at call time. The node determines at configuration time whether the CUG membership information concerning users whose addresses begin with each prefix configured on the node is ambiguous, and for those prefixes for which user CUG membership is ambiguous an associated indicator is set. At call time the indicator associated with the user involved in the call is checked. If the indicator is set the node creates CUG membership information about the involved user and uses the created information to authorize the call. If the indicator is not set, the CUG membership information is retrieved directly from the preprocessed CUG information table and used to authorize the call.

21 Claims, 9 Drawing Sheets

CLOSED USER GROUP PREPROCESSING DECISION FOR EFFICIENT CALL SECURITY VALIDATION

CROSS REFERENCE TO RELATED APPLICATIONS

This application claims priority of provisional patent application Ser. No. 60/059,267 filed Sep. 18, 1997.

STATEMENT REGARDING FEDERALLY SPONSORED RESEARCH OR DEVELOPMENT

Not Applicable

BACKGROUND OF THE INVENTION

The present invention is related generally to data communications networks, and in particular to security features of such networks.

In a typical prior art data communications network, each user of the network is coupled to a corresponding node that provides access to the network and the nodes in turn are coupled to each other by physical network media such as copper or fiber cable. For example, the nodes may be network switches responsible for establishing connections among various network segments interconnecting the users, as well as for establishing connections between the users and the inter-nodal medium. The users are computers, such as workstations, that use the network to exchange data in the form of files, mail messages, etc. The network is a collection of users, nodes, media, and other devices and interconnections that are centrally managed via a network management station (NMS) connected to the medium.

At any given time, the network has a configuration, one aspect of which is the distribution of addresses that uniquely identify network components. In general, each user is identified by a single unique address. The nodes may have associated therewith items known as prefixes commonly used for purposes of routing data through the network. Each prefix represents a portion of an address that is common to a set of users coupled to the respective node. For example, a pair of users on a given node having addresses 16165551212 and 16161234567 share the common prefix 1616. The prefix scheme allows for routing to be hierarchical, that is, for different parts of connections to be established by different elements in the network. In the example above, if a calling user is attempting to connect to a called user having the address 16161234567, the connection would first be routed to the node to which the called user is coupled, based solely on the 1616 prefix. The node would then extend the connection to the called user based on the remaining address portion 1234567.

The prefixes are stored in data structures on the nodes. in general there may be more than one prefix per node, depending of course on the configuration of addresses of the users coupled thereto. Additionally, there may be cases in which each node stores full addresses either in addition to or instead of prefixes. For such addresses, routing is performed in a non-hierarchical manner, i.e., each node examines the entire address in order to route connections. Because of the potentially mixed nature of the routing information at each node, the data structure in which the prefix or address resides on a node is referred to as an "address/prefix structure". Each node contains an address/prefix structure for routing purposes.

The typical network discussed above may be either of two known types. One type of network is referred to as a "packet-switched" network. In such a network, there never exists a dedicated channel between two users over which data is freely passed. Rather, data streams are segmented into discrete blocks known as "packets", and each packet is routed independently through the network over a series of "hops", or short interconnections. An example of such a protocol is the Internet Protocol (IP). In the other type of network, referred to as a "connection-based" network, data is transferred between users in streams of arbitrary length. A connection is set up between a calling user and a called user, then data is freely exchanged between them over the connection as though they were connected by a single private channel. This type of network is analogous to the public switched telephone network, in which two participants in a phone call enjoy an uninterrupted private connection for the duration of the call. An example of a connection-based network is Asynchronous Transfer Mode or ATM.

The present invention applies to connection-based network protocols such as those employed in an ATM network.

One extension of the ATM protocol is known as Closed User Group (CUG) functionality. In an ATM system having CUG support, sets of users form distinct entities called closed user groups, or CUGs, having properties that enable certain security measures to be used during network operation. The basic function enabled by using CUGs is the selective authorization of "calls", or connection requests, among network users. In general, a user A that is a member of a CUG can both call and receive calls from a user B that is a member of the same CUG, but cannot call or receive calls from a user C that is not a member of the same CUG. Through the use of CUGs, a network manager can establish sub-groups in the network within which communication is freely allowed, while restricting communications outside of such groups. An example of a network in which CUG functionality might be useful is a network having a portion dedicated to use by one company and another portion used by a joint venture in which that company and another company participate. The desire is for free data exchange among users within the company and among users within the joint venture, but limited and controlled exchange between the two organizations. To accomplish these goals, a different CUG could be established for each organization. Then one or more additional CUGs overlapping these two could be established to allow specific groups of users from the two organizations to communicate. CUGs have network-wide scope, and are therefore managed on a network-wide basis by the network management system or NMS. Each CUG has a unique identifier in the network and additional properties more fully discussed below. Formally, a CUG is a set of addresses and/or regular expressions each of which is known as a "CUG member" or a "CUG member rule". Each CUG has a set of member rules associated with it, and each member rule defines a characteristic possessed by the addresses of users who belong to that CUG. Most commonly, the member rules define prefixes. The membership of a CUG is the set of network users whose addresses all satisfy at least one of the member rules for that CUG. The structure, arrangement and use of member rules is described in more detail below.

In a network having CUG functionality, calls between users are authorized by determining the CUG membership of the calling user and called user, and then determining if they are members of any common CUGs. If so, the call is allowed to proceed, and if not, the call is rejected. This call-authorization process is transparent to the users except for the possibility of having a call request rejected, a possibility that exists whether CUGs are supported or not.

The call authorization process is carried out within the network, and involves in particular two nodes termed the "ingress node" and the "egress node". An ingress node is a node at which a call request is first received from a calling user, i.e., the node to which the calling user is coupled. Likewise, an egress node is the node from which the call request is forwarded on to a called user coupled to that node after being authorized.

The traditional manner in which CUG calls are authorized proceeds as follows. During the initialization of the network (or subsequent re-configuration, as necessary), each node receives from the NMS all the CUG member rules that might affect the CUG membership of users attached to that node; in general, each node may receive numerous rules and the received rules may be associated with many different CUGs. When a call is placed, each ingress and egress node carries out the following actions:

1) Find all member rules affecting the CUG membership of the calling and called users;

2) Determine which CUGs the calling and called users belong to;

3) Determine whether the calling and called users belong to at least one common CUG, in which case the call is authorized;

4) If the call is authorized, forward the call on toward the called user, and if not, drop the call and return a call rejection message to the calling user.

The general technique for call authorization described above requires significant processing at the time of a call, especially in larger networks having numerous users and potentially numerous CUGs and their associated member rules.

For this reason, a node such as a switch, for example, that offers CUG support using the traditional call-authorization technique has generally lower performance (as measured in connections established per second) than a similar switch having no CUG support. As a general matter, then, network managers have heretofore been required to sacrifice performance, or to achieve it at additional expense and complexity, in order to incorporate the desirable security-enhancing functionality of CUGs into their networks.

BRIEF SUMMARY OF THE INVENTION

An improved method of authorizing calls in networks employing closed user groups (CUGs) is disclosed. The method includes the creation and use of a preprocessed table of CUG information for each user at each node when possible, and improves the performance of such networks by reducing the amount of call-time processing required to authorize calls.

The method in general involves preprocessing of CUG member rules and network configuration information available to each node during a configuration phase of the network preceding an operational phase in which calls are placed among the users. The preprocessing creates tables that directly associate each user (based on address or prefix) with all the information regarding CUG membership for that user. At call time, CUG membership information is retrieved directly from the preprocessed tables based only on the addresses of the calling and called users, so that the step of finding all the relevant member rules is eliminated. Thus CUG membership information for a given user can be retrieved significantly faster and with less processing overhead at call time.

While the preprocessing is thus desirable, it may not be possible at some nodes depending on the relationship between the address configuration information of attached users and the pertinent CUG member rules. In particular, preprocessing cannot be performed at a given node if an attached user's CUG membership is ambiguous at configuration time, and so must be determined at call time. The nature of this ambiguity is described more fully below. Because such ambiguity is possible, the method also involves determining whether the CUG membership of the users attached to a node is ambiguous, and if so reverting to another call-authorization process such as the general scheme described above for call ingresses and egresses at such nodes.

DETAILED DESCRIPTION OF THE INVENTION

Provisional patent application Ser. No. 60/059,267 filed Sep. 18, 1997 is incorporated herein by this reference thereto.

Figure 1:
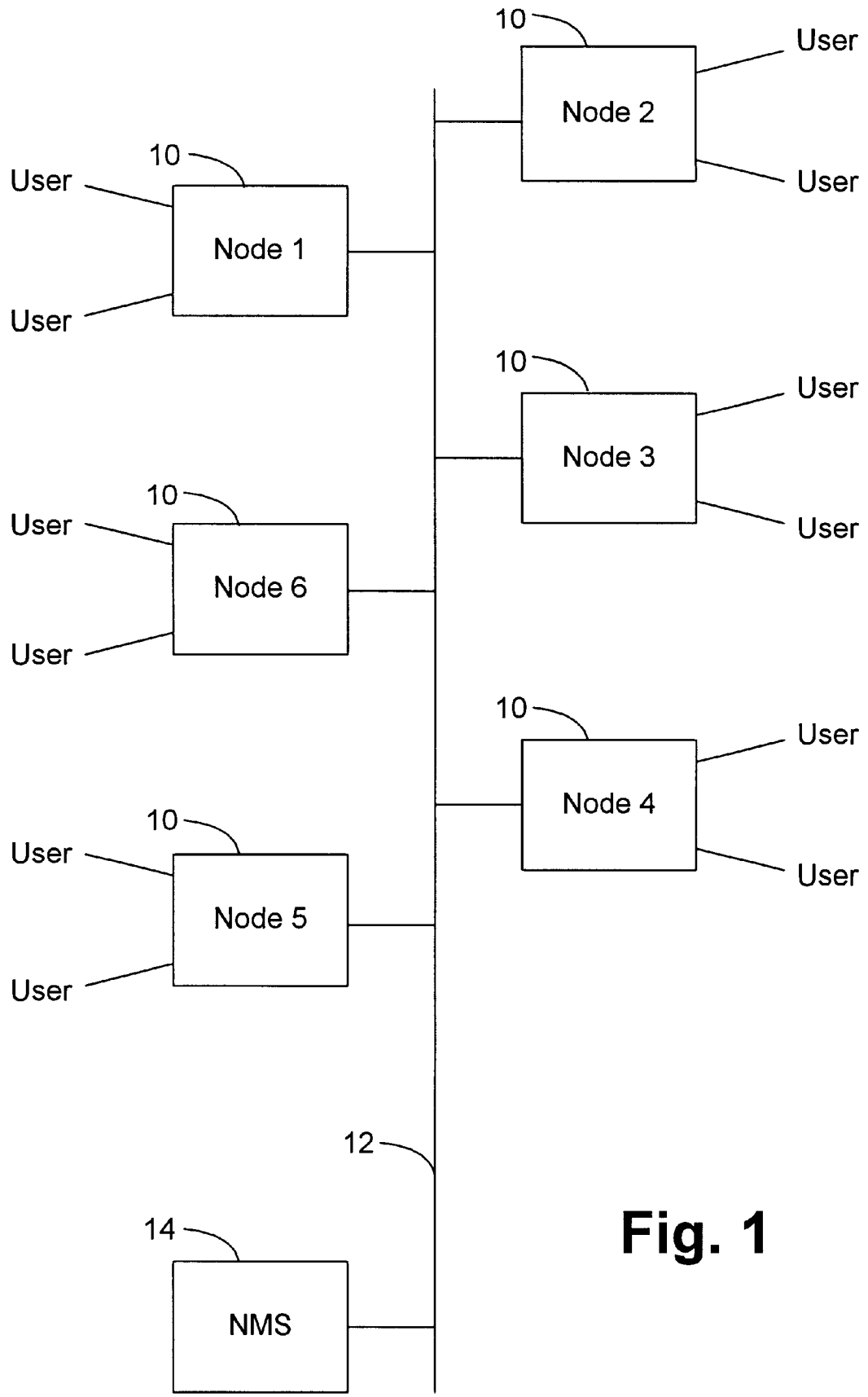
FIG. 1 is a schematic block diagram of a data communications network according to the principles of the present invention.

FIG. 1 illustrates a typical data communications network operable in accordance with the principles of the present invention. Groups of network users are each attached or otherwise coupled to one of several nodes 10, which may be for example network switches. The nodes 10 are interconnected by a physical medium 12, which may be for example copper or fiber cable. The network is centrally managed via a network management station (NMS) 14 also connected to the medium 12. As described in greater detail below, the CUG functionality of the present invention is distributed across the elements shown in FIG. 1. The NMS 14 is responsible for configuring and distributing CUG information to the nodes 10; it executes these tasks in response to input from a human operator via a suitable user interface, which can be designed using conventional techniques based on the description herein of the necessary management functions.

Although in FIG. 1 the nodes 10 are shown as being connected by a single medium 12, this arrangement is illustrative only. The network may provide for interconnections between the nodes 10 via any of a number of different network topologies. Additionally, it is possible for a "user" to actually be a subnetwork of interconnected users appearing to a node 10 as a single user for purposes of CUG functionality. Such variations may exist within the scope of the present invention and are realizable using known techniques and the teaching herein.

Figure 2:
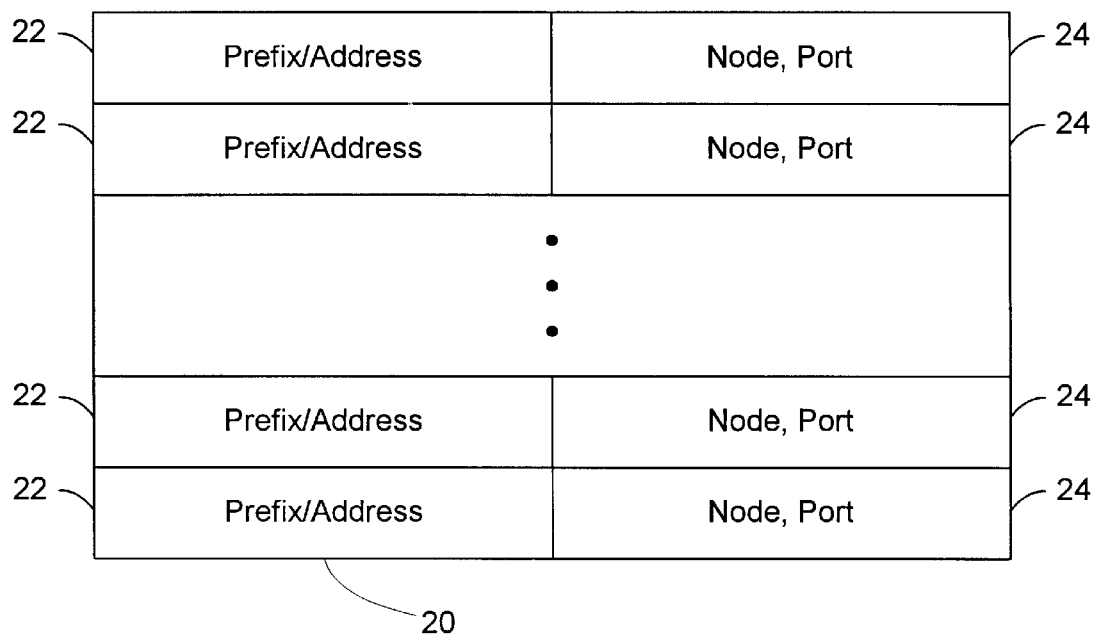
FIG. 2 is a diagram of an Address/Prefix Table maintaining address configuration information for the network of FIG. 1.

FIG. 2 shows an Address/Prefix Table 20 existing on the NMS 14. Each entry in the Address/Prefix Table 20 includes an address or prefix value 22 and a corresponding node identifier 24 identifying the network node 10 at which the address/prefix value 22 is configured. There is one entry in the Address/Prefix Table 20 for each address and prefix configured in the entire network. The Address/Prefix Table 20 is created, updated, and maintained by the network manager using primarily conventional techniques, with extensions to support CUG functionality. In particular, whenever the network configuration changes such that the Address/Prefix Table 20 is modified, several of the processes described herein must also be executed in order to update CUG information distributed throughout the network that is associated with the information in the table 20. The necessary updating will be apparent to one skilled in the art from the description herein.

Figure 3:
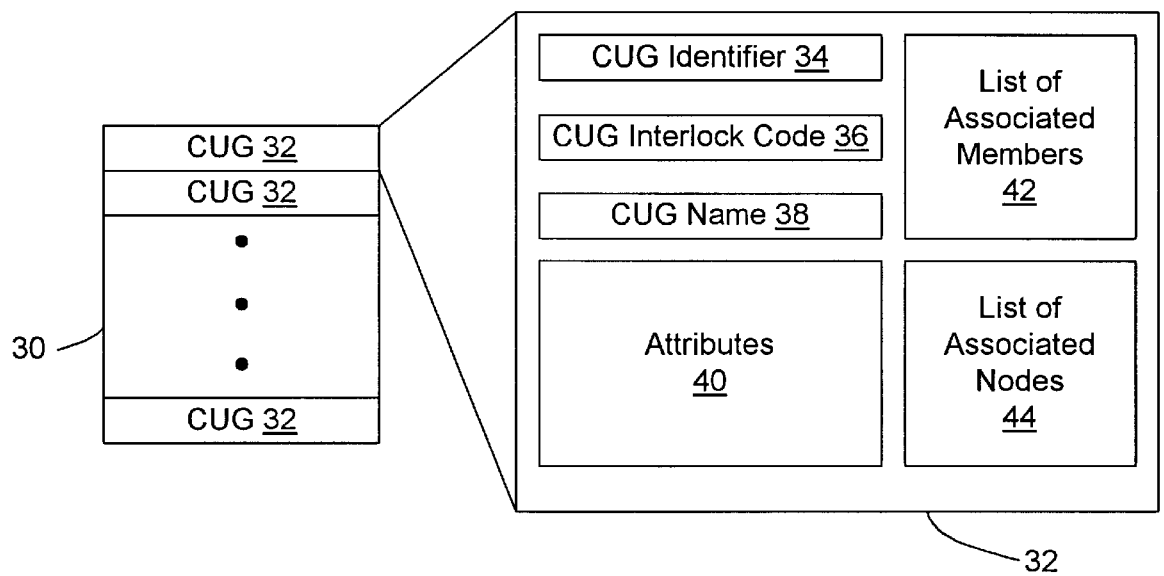
FIG. 3 is a diagram of a CUG Table maintaining CUG information for the network of FIG. 1.

FIG. 3 shows another structure existing on the NMS 14, a CUG Table 30 having one entry 32 per CUG in the network. Included in each entry 32 are a CUG Identifier 34, a CUG Interlock Code (IC) 36, a CUG Name 38, Attributes 40, a List of Associated Members 42, and a List of Associated Nodes 44. These structures are described below.

The CUG Identifier 34 is a network-wide identifier for the CUG in a single managed network, and in particular is used by the NMS 14 to identify the CUG. The CUG Table 30 is indexed by the CUG identifiers 34 so that the CUG can be uniquely identified by the NMS 14 for configuration purposes.

The IC 36 is an identifier for the CUG having broader uniqueness, i.e., it may be used to uniquely identify the CUG among multiple networks. The IC 36 appears in network messages pertaining to the CUG function in the network.

The CUG Name 38 is a displayable label for the CUG having meaning to an operator of the NMS 14.

The Attributes 40 are used to indicate features of the CUG 32 that are relevant to different aspects of CUG use and processing in the network 12. One attribute included in the field 40 is called "Preferential"; its use is described below in connection with FIG. 10.

The List of Associated Members 42 lists all members that belong to the CUG. To conserve storage space, a limit may be placed on the number of members that can be associated with any one CUG. In the illustrated embodiment, that limit is 128. The limit is chosen to minimize storage requirements without unduly restricting the flexibility with which CUGs are defined, although the limit may be chosen to meet specific network needs.

The List of Associated Nodes 44 lists all nodes 10 to which information about the CUG is distributed. The list 44 is formed as the union of data structures called "node lists", one of which is created for each member of the CUG. Node lists and their creation are described below.

Figure 4:
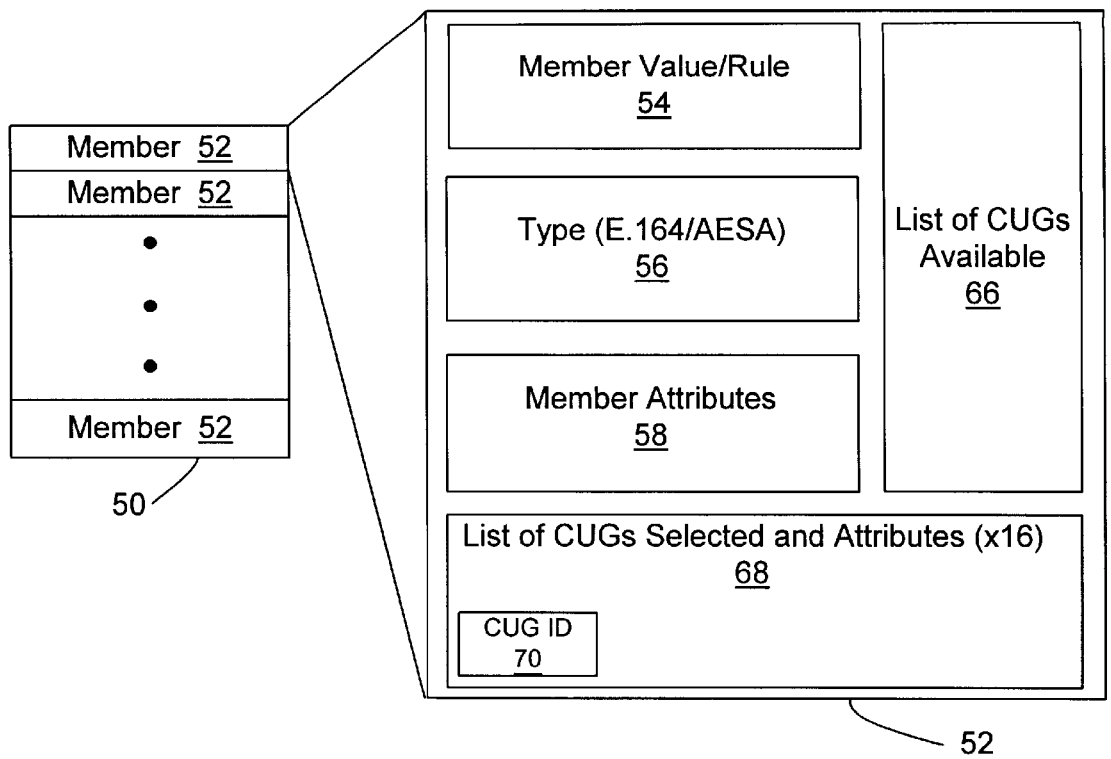
FIG. 4 is a diagram of a Member Table maintaining additional CUG information for the network of FIG. 1.

The NMS 14 also contains a Member Table 50 shown in FIG. 4 which is a list of all CUG members 52 defined in the network and their attributes. In particular, the Member Table 50 associates each member 52 with one or more CUGs for which it defines part of the membership. Included in a Member Table Entry 52 are a Member Value or Member Rule 54, a Member Type 56, a set of Member Attributes 58, a List of CUGs Available 66, and a List of CUGs Selected 68 which includes for each selected CUG a CUG identifier 70 and other attributes. These structures are described in turn below.

The Member Rule 54 is an address or regular expression defining a set of addresses. The Member Type field 56 indicates the type of addresses defined by the Member Rule 54. Two predominant and well-known address schemes in ATM are E.164 and AESA (ATM End Station Address). Because these address types differ in their structure, the Member Type field 56 is used to differentiate them when they are processed by elements in the NMS 14 or nodes 10.

The Member Attributes 58 are miscellaneous boolean attributes of the member 52, such as access rights on outgoing calls and incoming calls.

The List of CUGs Available 66 is a list of all configured CUGs that are configured in the network but not yet associated with the member rule. Some or all of these CUGs may become associated with the member rule during the CUG configuration process.

The List of CUGs Selected 68 is a list of all the CUGs that have been associated with this member 52, along with the attributes of the associated CUG. To conserve storage space, a limit may be placed on the number of CUGs that may be selected to be associated with any one member 52; in the illustrated embodiment, the limit is 16. This limit is chosen to give the network manager configuration flexibility while minimizing storage space.

Figure 5:
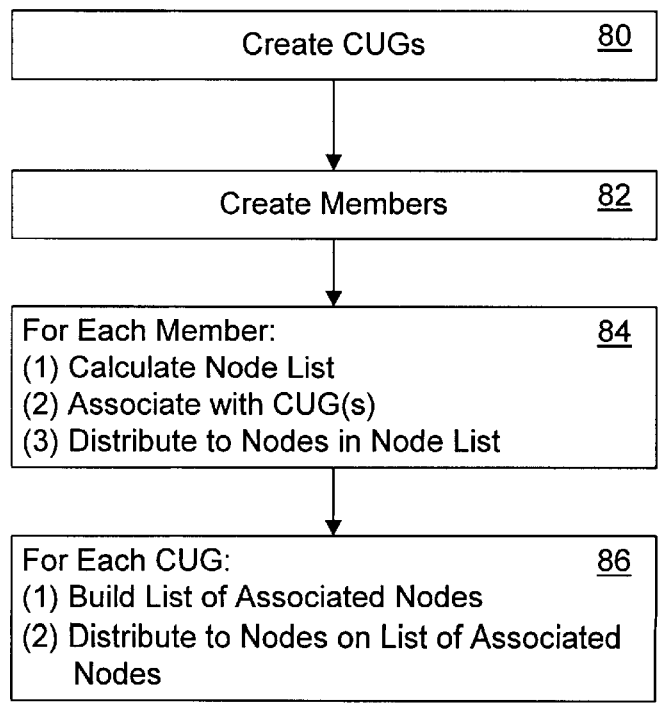
FIG. 5 is a flow diagram of part of a CUG configuration process carried out primarily by a network management station in the network of FIG. 1.

FIG. 5 shows a flow diagram of a CUG configuration process, including in particular portions carried out by the network manager and the NMS 14 in cooperation with the nodes 10 as needed. The illustrated process assumes the existence of the Address/Prefix Table 20 of FIG. 2, which can be created beforehand by conventional network address configuration processes. Recall that the Address/Prefix Table 20 associates each configured address and prefix with a node 10 to which a user having that address or prefix is coupled.

In step 80 of FIG. 5, one or more CUGs is created by the network manager. This step involves populating the CUG Table 30 of FIG. 3 with entries 32 each containing a CUG Identifier 34, and IC 36, and a CUG Name 38. For the time being, the List of Associated Members 42 and List of Associated Nodes 44 are left empty, because no associations between the CUG and either a node 10 or a member 52 have been made.

In step 82, members 52 are created, and along with them the Member Table 50. The items created are the Member Rule 54, the Member Type 56, and some Member Attributes 58. The member rules 54 define individual users or groups of users that are like building blocks in the CUG scheme; they are created in a known manner to achieve the goals of the network manager. For example, the member rules created for the 3-domain joint-venture network described above must collectively be sufficient to describe all the users (by address or prefix) in both companies, in order to include all users in the CUG scheme. But the created rules must also be sufficiently granular to allow CUG partitioning, i.e., to exclude users from CUGs as necessary.

In step 84, several sub-steps are performed for each member 52. First, a structure called the member rule's "node list" is calculated. This process involves the comparison of the Member Rule 54 with all the addresses and prefixes 22 stored in the Address/Prefix Table 20 of FIG. 2. This comparison process is described in greater detail with reference to FIG. 6 below. For each matching prefix/address, the corresponding node value 24 from the Address/Prefix Table 20 is added to the member's node list. Each member 52 is then associated with one or more of the CUGs previously created. This is the step in which the membership of each CUG is defined according to the goals of the network manager, for example to realize a 3-domain network for a joint venture as described above. The result of the association process is the filling in of the List of Associated Members 42 in the CUG entries 32, and also the filling in of the List of CUGs Selected 68 in the members 52.

After the member's node list is calculated and its CUG associations made, the member 52 is distributed to all the nodes 10 listed in the node list. The nodes 10 use the received member information during subsequent configuration and operation of the CUG function in the network, as is described in greater detail below.

Finally, in step 86 the process returns to the CUGs. For each CUG entry 32, its List of Associated Nodes 44 is built. Recall that this is simply the union of the node lists of all the associated members 52, as listed in the List of Associated Members 42. Once the List of Associated Nodes 44 is built, the CUG entry 32 is distributed to all the nodes 10 in the List of Associated Nodes 44.

Figure 6:
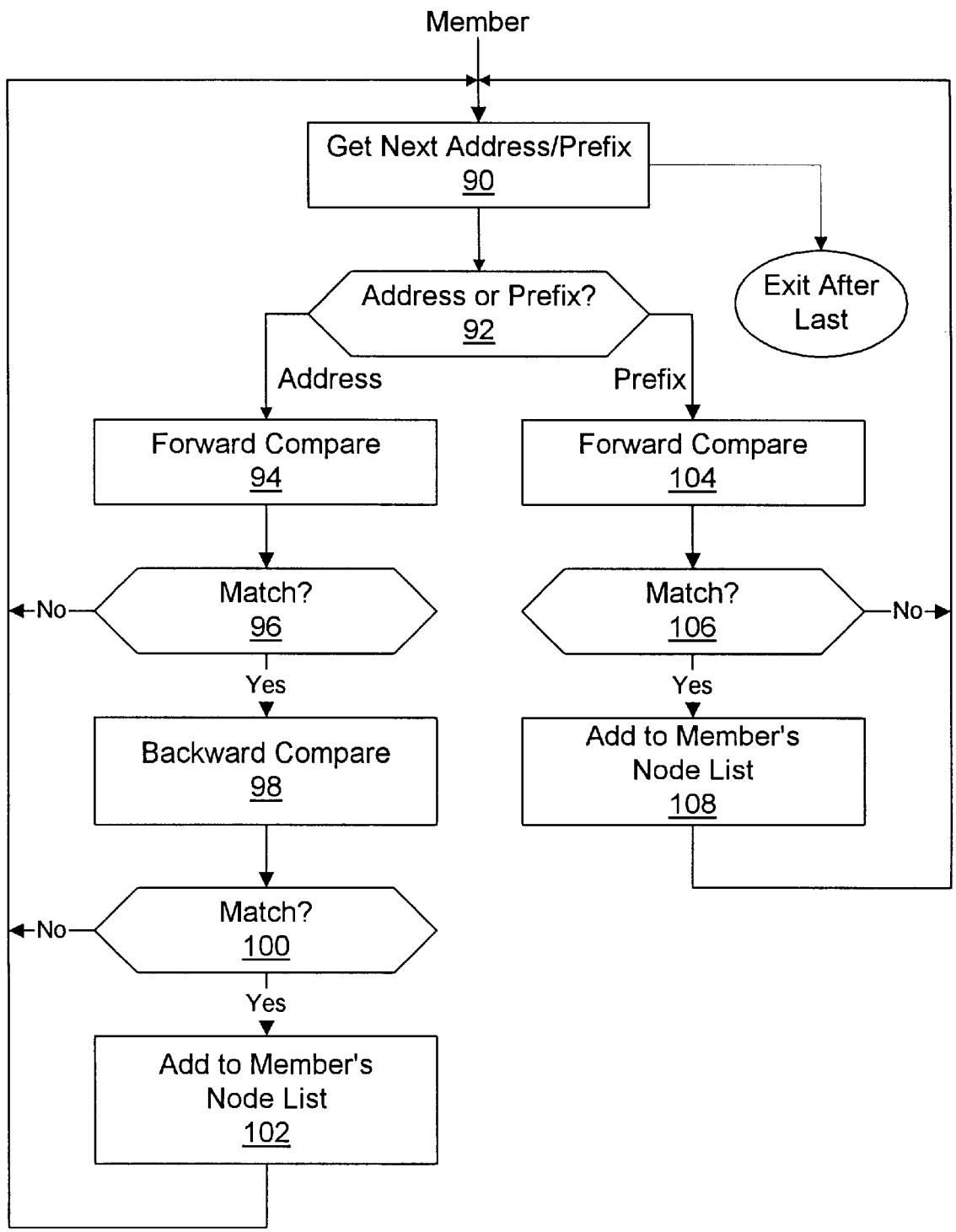
FIG. 6 is a flow diagram for a process of building a node list during the CUG configuration process of FIG. 5.

FIG. 6 shows part of the member-processing step 84, namely the process for calculating the members' node list. In step 90, an address or prefix entry is retrieved from the Address/Prefix Table 20 of FIG. 2. The process then forks at step 92 depending on whether the entry is an address or a prefix. For addresses, a forward comparison is done at step 94. A forward comparison begins at the most significant digit and proceeds digit-by-digit until one of the following exit conditions occurs, with the result indicated:

| EXIT CONDITION | RESULT |
| --- | --- |
| Digit mismatch | No match |
| '*' in member rule | Match |
| Address runs out of digits | Match |
| Rule runs out of digits | No match |

An example of a successful forward comparison is that between a member rule 1508* and an address 15085551212. The comparison finds matches for '1', '5', '0', and '8', and then terminates upon encountering the '*' in the member rule. The '*' is a string wildcard character that matches any string of zero or more digits in the address or prefix. The member rules may also include a digit wildcard character '?', which matches a single corresponding digit in the address/prefix.

The result of the forward comparison is checked at step 96. If no match occurred, the process returns to the beginning to examine the next address/prefix 22 in the Address/Prefix Table 20. If a match did occur, a backward comparison is then performed in step 98. The backward comparison has the same exit conditions and corresponding results as those given above for the forward comparison, but the backward comparison begins at the least significant digit and then proceeds digit-by-digit in the direction opposite to that of the forward comparison.

The result of the backward comparison is checked at step 100. If a match did not occur, the process returns to step 90 and the next address/prefix. If a match did occur, meaning that the address both forward and backward matches the member rule, the address is added to the member's node list at step 102, and the process returns to the beginning for the next address/prefix.

If in step 92 it is determined that a prefix is being examined, the process executes steps 104 through 108 as shown. This process is the same as the process just described for an address, except that a prefix need only forward-match the member rule.

Figure 7:
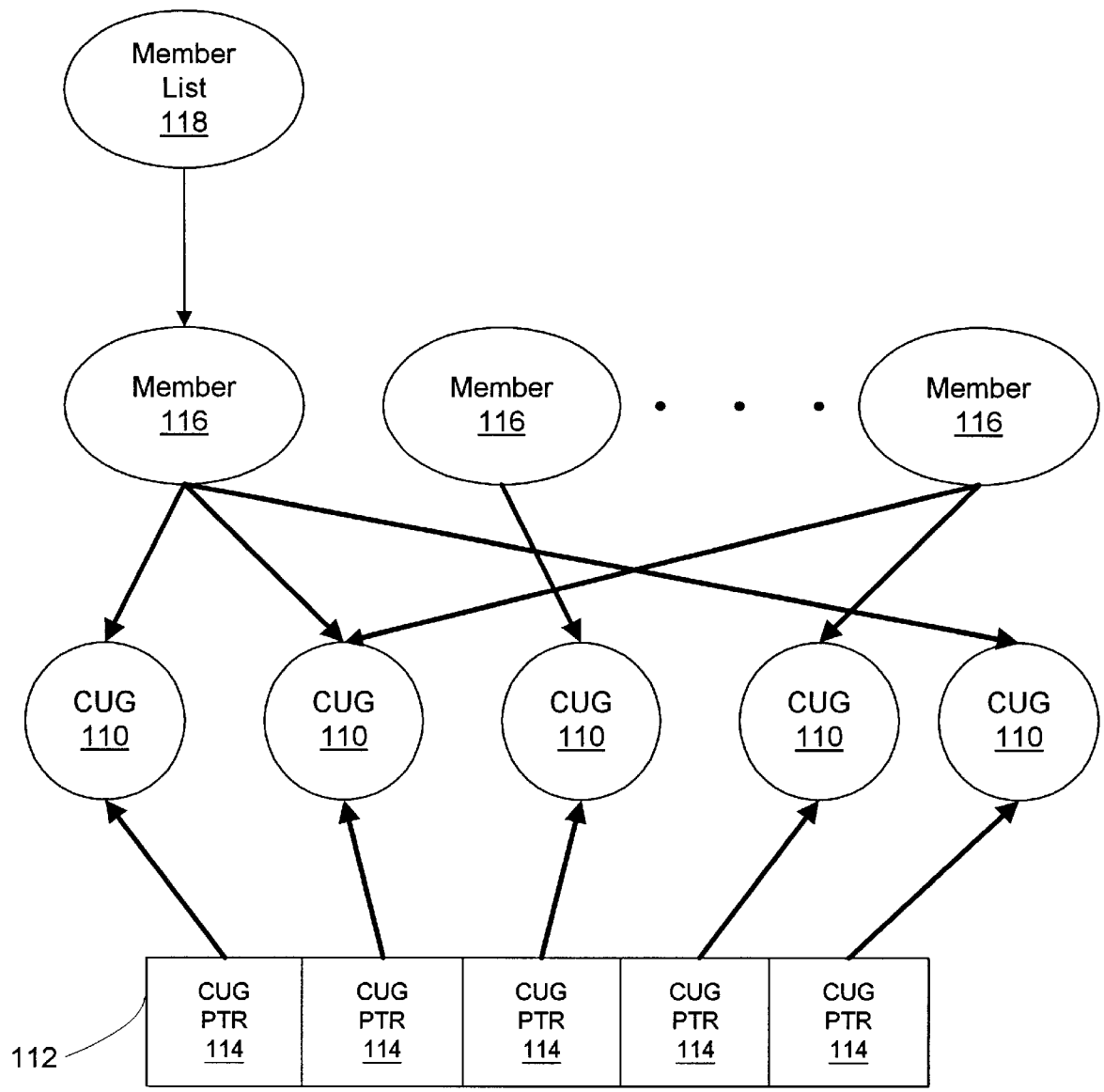
FIGS. 7 and 8 are diagrams of several CUG-related data structures on the nodes of the network of FIG. 1.

FIG. 7 illustrates several data structures appearing on each node 10. Each node 10 stores the CUG information it receives from the NMS 14 in CUG Objects 110. The CUG objects are referenced by a CUG List 112 containing an array of CUG Object Pointers 114, each pointing to a corresponding CUG Object 110. Member information received from the NMS 14 is stored in Member Objects 116. The Member Objects 116 are arranged as a linked list, with the head of the list being pointed to by a Member List 118. Each Member Object 116 points to one or more of the CUG Objects 110 with which it is associated, as indicated by the List of CUGs Selected 68 appearing in the members 52 received from the NMS 14.

Figure 8:
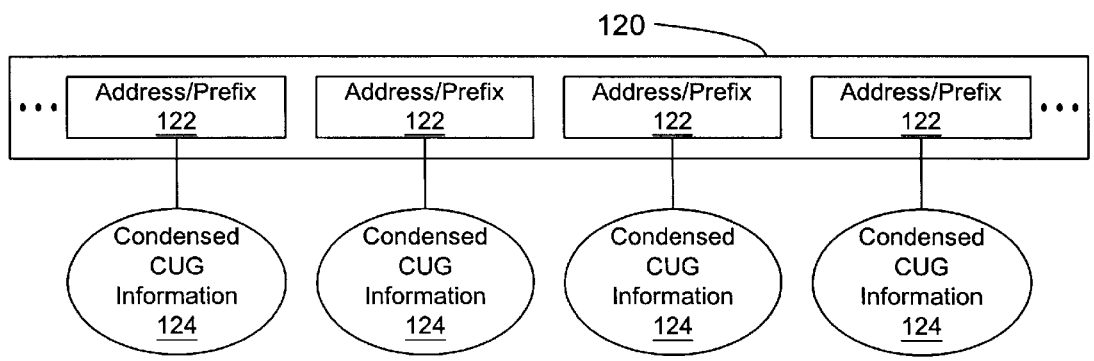

FIG. 8 shows an additional data structure created by each node 10 while configuring itself for CUG functionality. Each node 10 contains an address/prefix table 120 containing addresses and prefixes configured on the node, generally a subset of the Address/Prefix Table 20 of FIG. 2. Each entry 122 in the node's address/prefix table 120 is associated with a corresponding block of condensed CUG information 124 created by the node during its configuration process as described below. This condensed CUG information is used during the process of authorizing calls as described in greater detail below.

Figure 9:
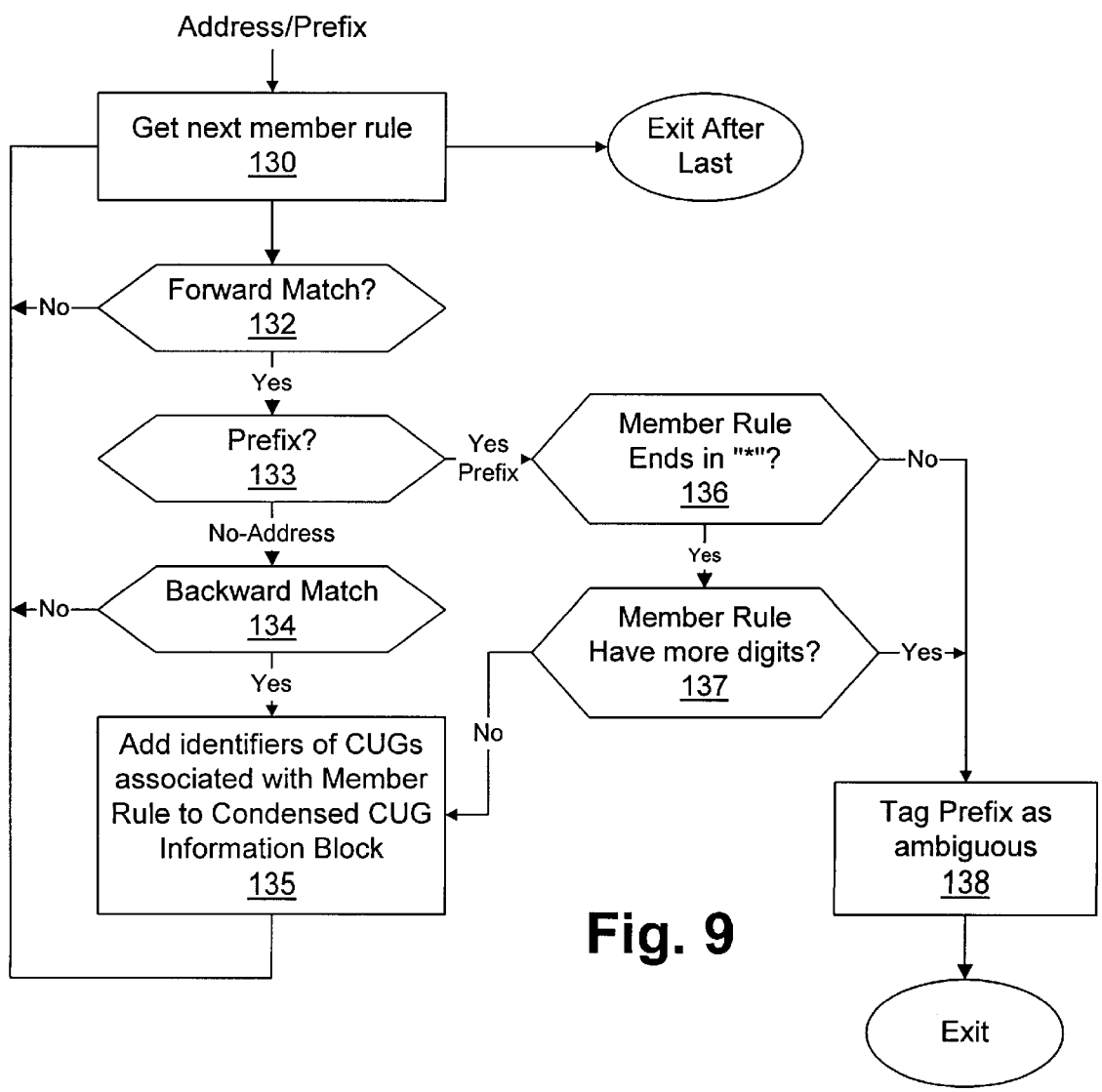
FIG. 9 is a flow diagram of a CUG configuration process carried out by the nodes of the network of FIG. 1.

FIG. 9 illustrates the configuration process at each node 10 that results in the creation of a condensed CUG information block 124 for each address/prefix 122 as shown in FIG. 8. In step 130 of FIG. 9, a member rule is retrieved from a Member Object 116. A forward comparison between the address/prefix 122 and the member rule is done in step 132, and if there is no match the process loops back to step 130 to examine the next member rule. Note that if upon any execution of step 130 there are no more member rules, the process terminates.

If a forward match is detected at step 132, then the process proceeds to step 133, which ascertains whether a prefix is being operated on (as opposed to an address). If not, this means that an address is being operated on, and a backward comparison is done in step 134. If no match occurs, the process returns to the beginning and the next member rule. If a backward match does occur, then the address satisfies the rule. In this case operation proceeds to step 135 in which the CUG identifiers and other information (obtained from CUG Objects 110 ) about all the CUGs associated with the matching member rule 116 are added to the condensed CUG information block 124 associated with that address 122. Thereafter the process loops back to the beginning to work on the next member rule 116.

If in step 133 it is determined that a prefix is being operated upon, the process proceeds to step 136, in which the member rule is tested to determine whether it ends in a '*'. If not, it indicates that the member rule being examined is more specific than the address/prefix 122 for which a condensed CUG information block 124 is being created, i.e., the member rule encompasses some but not all of the user addresses configured at the node 10 that begin with the prefix 122. In such a case, it is unknown at configuration time whether all the users coupled to that node 10 having such addresses satisfy the member rule or not; indeed, it is quite possible that not all do. Therefore, the prefix 122 is tagged as "ambiguous" in step 138 by setting an ambiguity indicator stored in the condensed CUG information block 124, and the process then terminates. The ambiguity indicator is used during subsequent call authorization in a manner described in greater detail below.

If in step 136 it is determined that the prefix does end in a '*', one final check is made in step 137, namely whether the member rule has additional digits beyond those that forward-match the prefix. If so, the member rule is more specific than the address, so the process executes step 138 as described above. If not, the member rule has been determined to be no more specific than the prefix, i.e., all user addresses beginning with that prefix at that node satisfy the member rule. In this case, the process proceeds to step 135 as described above for matching addresses.

It should be noted that an address/prefix 122 is tagged "ambiguous" only when step 138 is executed for it; the default condition for addresses/prefixes 122 is "unambiguous".

As an example to illustrate the process of FIG. 9, consider the following configuration:

Prefixes 122

1508
1616555

Member rules in Member Objects 116

1508*
1508?55*
1616*

(Recall that '*' replaces a string and '?' a digit)

1. For the 1508 prefix, the process yields the following results:

| Member rule | Match? | End in '*'? | More digits? |
|---|---|---|---|
| 1508* | Yes | Yes | No |
| 1508?55* | Yes | Yes | Yes |
| 1616* | No | n/a | n/a |

Because the member rule 1508?55* has digits beyond those matching the prefix 1508, the prefix 1508 is tagged as "Ambiguous".

2. For the 1616555 prefix, the process yields the following results:

| Member rule | Match? | End in '*'? | More digits? |
|---|---|---|---|
| 1508* | No | n/a | n/a |
| 1508?55* | No | n/a | n/a |
| 1616* | Yes | Yes | No |

Because all matching member rules end in '*' and have no more digits beyond the match, the prefix 1616555 is not tagged as "Ambiguous".

Figure 10A:
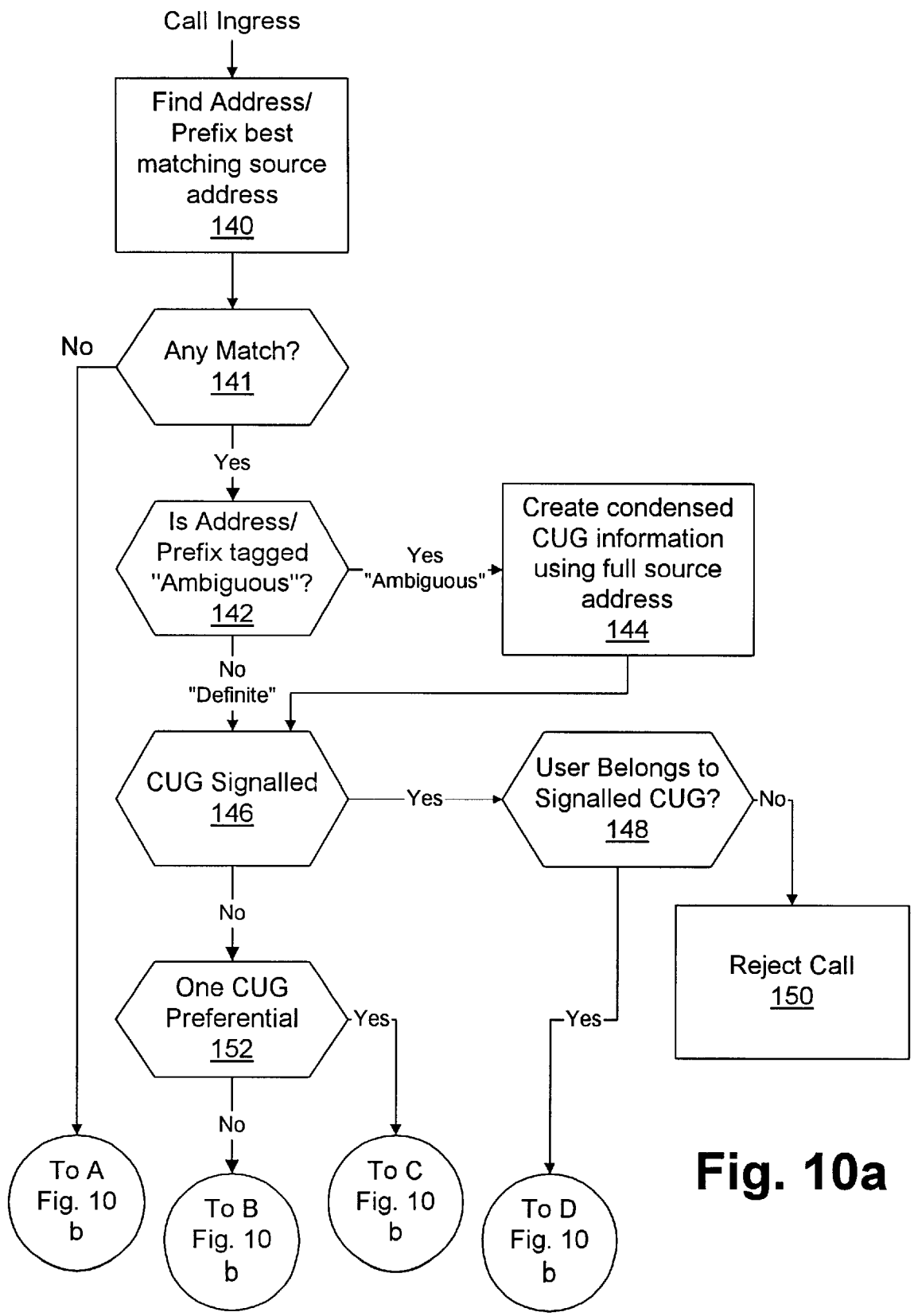
FIGS. 10A and 10B are flow diagrams of the processing performed at a node in the network of FIG. 1 at call ingress.
Figure 10B:
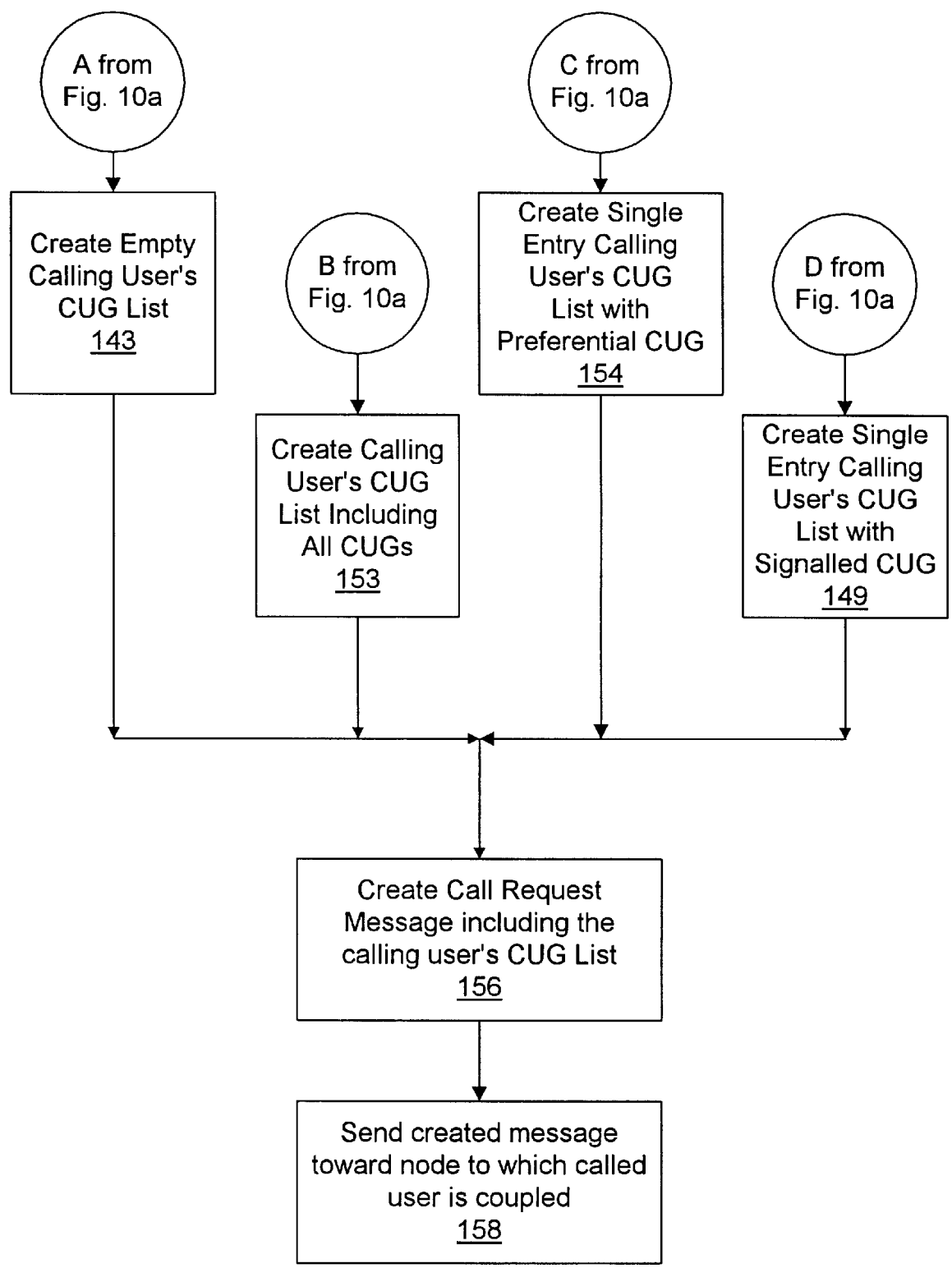

FIG. 10 shows the processing that occurs at a node 10 in response to a call ingress, i.e., a call request message is originating from a calling user coupled to that node 10. In step 140, the source address of the call request message is compared against the entries 122 in the node's address/prefix table 120. For addresses, an exact match (if any exists) must be found. For prefixes, a technique referred to as "longest match" is used, in order to select from among multiple matching prefixes if more than one matching prefix is found. Basically, the prefix 122 having the most digits matching corresponding digits in the source address is chosen. This is equivalent to selecting the more specific prefix 122 over the more general one. If two or more entries 122 are tied for longest match, then one of these is selected according to some other criteria, such as simple random choice.

As a general matter, at least one match is found in step 140. However, it is possible that the calling party address is not configured at the ingress node or port, in which case no match exists. This may happen, for example, if the calling party is not authorized to use the network 12 at all. Normally at a node 10 there are additional known network security features apart from the method of FIG. 10 that would detect this condition and reject the call. But because such a condition is possible, step 141 is necessary to check whether a match is found, and if not to bypass those steps in FIG. 10 that assume that a matching address/prefix entry 122 is found. If no match is found in step 141, processing proceeds to step 143, which is described in greater detail below.

If a match is found in step 141, the process proceeds to step 142, in which the ambiguity indicator conditionally set by the process of FIG. 9 is checked to determine if the CUG membership information for the matching address/prefix is ambiguous. If so, the process proceeds to step 144, in which condensed CUG information is created based on the full source address. This involves checking the source address against all the member rules stored in the Member Objects 116. Most of the time the "No" branch is taken at step 142 (i.e., the prefix 122 is not ambiguous), so that step 144 is usually bypassed.

Theoretically the creation operation 144 could be completely eliminated, if the addresses/prefixes and CUGs in the network were configured such that no ambiguity existed at any network node. This could be accomplished by a combination of reducing the generality of the entries in the node's address/prefix table 120 and increasing the generality of the member rules. However, such steps would tend respectively to make routing less efficient and to decrease the flexibility with which CUG membership is tailored. As a practical matter, then, provision must be made for a conditionally-executed creation step like that of step 144.

Step 146 operates to detect a special mode of CUG operation in which the user signals to the network the CUG that should be used for the call. The user accomplishes this by inserting a locally defined CUG Index 34 into the call message received by the ingress node. The value of the CUG index is provisioned by the network and maps to a particular CUG. If a CUG identifier is found in the message, it is checked in step 148 against the CUG identifiers found in the condensed CUG information to determine whether the user is in fact a member of the signalled CUG. If not, the call is rejected in step 150 by returning a call rejection message to the user. If so, processing proceeds to step 149, which is described below.

The "condensed CUG information" referred to above and in connection with other steps in FIG. 10 is either the preprocessed condensed CUG information 124, if the address/prefix entry is not ambiguous, or the condensed CUG information created in step 144.

If no signalled CUG is found in step 146, in step 152 the "Preferential" attribute (from Attributes 40 of FIG. 3) of each CUG in the condensed CUG information is checked. When set, this attribute indicates that the associated CUG is a default CUG that should be used when no CUG is signalled by the user. If a Preferential CUG exists, processing proceeds to step 154; otherwise it proceeds to step 153.

In steps 143, 153, 154, and 149, a CUG list is created for the calling user. The list is created differently depending on the results of the preceding steps in FIG. 10, as follows:

1. If no matching address/prefix is found (step 141—No) an empty list is created in step 143.

2. If a valid CUG is signalled (steps 146—Yes, 148—Yes), a list having the signalled CUG as the sole entry is created in step 149.

3. If no CUG is signalled but a Preferential CUG is found (steps 146—No, 152—Yes), a list having the preferential CUG as the sole entry is created in step 154.

4. If no CUG is signalled and no Preferential CUG is found (steps 146—No, 152—No), a list including all CUGs in the condensed CUG information is created in step 153. This list is usually non-empty, but may not be.

Any created CUG list that is non-empty includes the CUG Interlock Codes (ICs) of the CUGs included in the list.

The created CUG list is then included in a call request message created in step 156. If the included CUG list is empty, the call is referred to as a "non-CUG call"; if non-empty, a "CUG call".

In step 158 the ingress node 10 sends the created call request message on the network toward the node 10 to which the called user is coupled.

Figure 11:
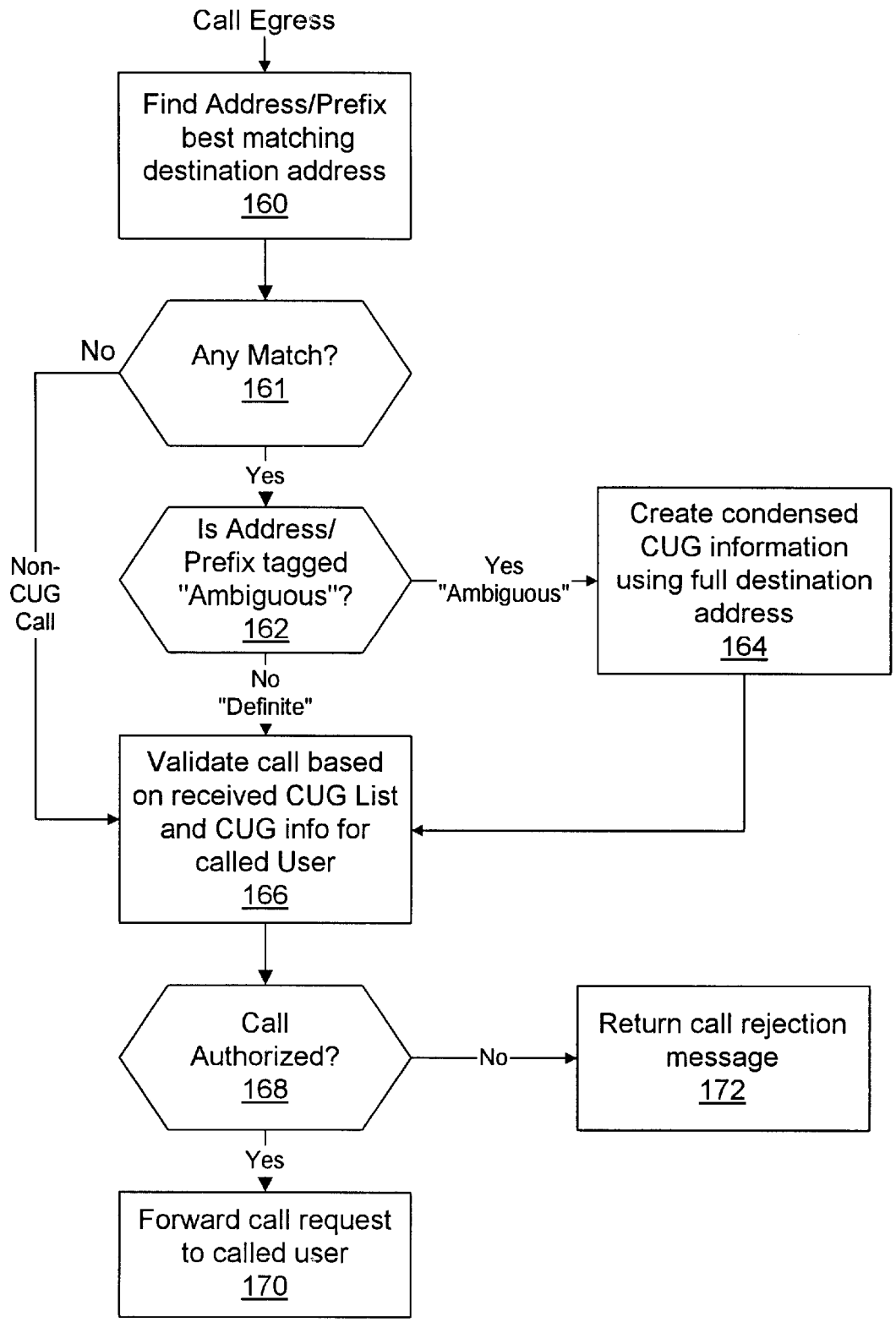
FIG. 11 is a flow diagram of the processing performed at a node in the network of FIG. 1 at call egress.

FIG. 11 shows the processing that occurs at a node 10 in response to a call egress, i.e., a call request message received from the network destined for a called user coupled to that node 10. In step 160, the destination address of the call request message is compared against the entries 122 in the node's address/prefix table 120, also using the longest match technique. If no match is found (step 161), the call process proceeds to step 166 bypassing steps 162 and 164. In step 166 the call is processed as a non-CUG call in a manner described in more detail below.

A match will normally be found in step 161. However, the check is necessary in case of routing or other errors occurring in the network 10, or attempted breaches of security as described above in connection with FIG. 10.

If a match is found, the process proceeds to step 162, in which the ambiguity indicator is checked to determine if the CUG membership information for the matching address/prefix 122 is ambiguous. If so, the process proceeds to step 164, in which condensed CUG information is created based on the full destination address. As so far described, the processing for a call egress is practically identical to that for a call ingress, except that the destination address rather than the source address is used.

At step 166, the call is validated based on the CUG list of the calling user included in the call request message and the condensed CUG information for the called user (again, either the preprocessed information or the information created in step 164 ). This involves determining whether both users are members of a common CUG. The following cases are handled:

1. If the incoming call is a non-CUG call (i.e., has an empty CUG list), the call is authorized (step 168) only if the CUG list for the called user is also empty. In that case, the call is forwarded to the called user in step 170. If the called user's CUG list is non-empty, the call is rejected in step 172.

2. If the incoming call is a CUG call (i.e., has a non-empty CUG list), the call is authorized (and forwarded in step 170) if the called user's CUG list is non-empty and includes at least one CUG that is also included in the call message's CUG list. If the called user's CUG list is empty or does not include any CUGs listed in the call message, it is rejected in step 172.

In the forwarding step 170, the egress node may signal the CUG to be used for the call to the user by including its identifier in the forwarded call request. This is an optional feature enabling the called user to reject the call if for some reason it prefers not to use the signalled CUG for the received call.

A detailed example is presented to illustrate CUG operation within the network. Assume the network has 6 nodes with the following configuration of prefixes:

| Node | Prefixes |
|---|---|
| 1 | 1508 |
| 2 | 1508555 |
| 3 | 1616 |
| 4 | 1616555 |
| 5 | 1203 |
| 6 | 1203555 |

And assume the following CUGs:

| CUG | Member rules |
|---|---|
| A | 1616* |
| B | 1508* |
| C | 1508555*, 1616555* |

The following processes occur at configuration time:

1. The NMS creates the node lists for the member rules as follows:

| Member rule | Addr./Prefix | Comparison Exit Conds. | Node List | CUGs |
|---|---|---|---|---|
| 1616* | 1616 | * in rule | (3) | A |
|  | 1616555 | * in rule | (3,4) | A |
| 1508* | 1508 | * in rule | (1) | B |
|  | 1508555 | * in rule | (1,2) | B |
| 1508555* | 1508 | < digits | (1) | C |
|  | 1508555 | * in rule | (1,2) | C |
| 1616555* | 1616 | < digits | (3) | C |
|  | 1616555 | * in rule | (3,4) | C |

(The comparisons terminating due to mismatching digits are not shown in the above table)

2. The NMS distributes the CUGs to the nodes as follows:

| Node | Members | CUGs |
|---|---|---|
| 1 | 1508*, 1508555* | B, C |
| 2 | 1508*, 1508555* | B, C |
| 3 | 1616*, 1616555* | A, C |
| 4 | 1616*, 1616555* | A, C |
| 5 | {None} | {None} |
| 6 | {None} | {None} |

3. Each node creates condensed CUG information as follows:

| Node | Addr./Pref. | CUG Info |
|---|---|---|
| 1 | 1508 | {Ambiguous - rule 1508555*} |
| 2 | 1508555 | B, C |
| 3 | 1616 | {Ambiguous - rule 1616555*} |
| 4 | 1616555 | A, C |
| 5 | 1203 | {None} |
| 6 | 1203555 | {None} |

(Note the distinction between Ambiguous and None. The prefixes on nodes 5 and 6 are not Ambiguous because their CUG membership -- None -- is definitely known at configuration time.)

The following occurs at two different call times

Call 1 (allowed)
Calling User Address—15085551212 (ingress node 2)
Called User Address—16165551212 (egress node 4)

At node 2, the source address 15085551212 matches address/prefix 1508555 (longest match), which is not tagged as ambiguous, so a call request message is created including associated CUGs {B, C} and sent on the network toward node 4 (longest match routing used).

At node 4, the destination address 16165551212 matches the address/prefix 1616555, which likewise is not ambiguous. Thus the CUG sets (B, C) from the message and {A, C} retrieved from the condensed CUG information block are compared. Since CUG {C} is in both sets, the call is allowed.

Call 2 (rejected)
Calling User Address—12035551212 (ingress node 6)
Called User Address—15088881212 (egress node 1)

At node 6, there are no CUGs associated with the source address 12035551212, so a call request message with an empty CUG list is created and sent on the network toward node 1.

At node 1, the destination address 15088881212 matches the address/prefix 1508, which is tagged as Ambiguous. Therefore node 1 creates condensed CUG information based on the full destination address. The destination address satisfies only member rule 1508*, which is associated with CUG B. Thus the CUG sets {None} from the message and {B} retrieved from the condensed CUG information block are compared. Since there is no common CUG, the call is not authorized, so a call rejection message is returned to the calling user.

While the foregoing has described a particular embodiment of the present invention, there are other embodiments that may rely on differing specific mechanisms. In particular, all the information regarding CUGs may be simply duplicated at each node by the network manager/NMS, instead of being distributed according to the process of FIG. 6. Also, other specific data structures and NMS controls/interfaces may be used according to principles known in the art. Likewise, other modifications to and variations of the disclosed methods for authorizing calls among CUG users are possible without departing from the innovative concepts contained herein. Accordingly the invention herein disclosed is not to be viewed as limited except as by the scope and spirit of the appended claims below.

We claim:

1. A method of operating a node in a network having closed user groups (CUGs) of network users involved in call requests, comprising the steps of:

determining whether the membership in each CUG of users attached to a network node is ambiguous based on a list of CUG member rules and a set of characteristics of addresses of the attached users that are known to the network node;

if the CUG membership of the attached users is ambiguous, then ensuring that an indicator has a value indicating such ambiguity;

if the CUG membership of the attached users is not ambiguous, then performing the steps of:
   (i) ensuring that the indicator has another value indicating such non-ambiguity;
   (ii) determining the CUG membership of the attached users from the known member rules and address characteristics; and
   (iii) creating a CUG information table indexed by the known address characteristics, the table associating each characteristic with zero or more CUG identifiers each identifying a different CUG of which those attached users whose addresses possess the associated characteristic are members.

2. A method according to claim 1, wherein the known characteristics include prefixes of addresses configured for use by the attached users, and wherein the ambiguity-determining step comprises the step of determining whether for any prefix there exists a member rule defining a potentially partial set of the configured addresses having that prefix, in which case the CUG membership information of the attached users is ambiguous.

3. A method according to claim 2, wherein the rule-existence-determining step comprises the steps of:

for each combination of a prefix and a member rule until a partial-set-defining rule if any is found, performing the steps of:

comparing corresponding digits of the member rule and the prefix beginning at the most significant digit position and proceeding toward the least significant position until either (i) corresponding digits do not match, (ii) a string wildcard character is encountered in the member rule, (iii) the prefix runs out of digits, or (iv) the rule runs out of digits;

if the comparing step terminates due to conditions (ii) or (iii), then determining whether the member rule is more specific than the prefix, in which case the member rule is a partial-set-defining rule.

4. A method according to claim 1, wherein: (i) the network has other nodes to which other users are attached; (ii) there exists for the network a complete list of CUG member rules for all CUGs defined in the network, some of the member rules in the complete list potentially describing CUG membership of users attached to the node of claim 1, and others of the member rules in the complete list describing CUG membership of users attached to other nodes and not describing CUG membership of any users attached to the node of claim 1; and (iii) the list of CUG member rules known to the node of claim 1 is a subset of the complete list, the subset containing the member rules potentially describing CUG membership of the users attached to the node of claim 1 and not containing any of the other member rules.

5. A method according to claim 4, wherein the network has a network management station operable to create the subset of known member rules from the complete list, and further comprising the step of receiving the created subset from the network management station.

6. A method according to claim 1, wherein the network has a network management station to which the list of CUG member rules is also known, and further comprising the step of receiving the list of CUG member rules from the network management station.

7. A method according to claim 1, wherein: (i) the indicator has the non-ambiguity-indicating value by default, (ii) the step of ensuring that the indicator has the ambiguity-indicating value comprises setting the indicator to the ambiguity-indicating value, and (iii) the indicator-value-ensuring step comprises refraining from setting the indicator to the ambiguity-indicating value.

8. A method of operating a node in a network having closed user groups (CUGs) of network users involved in call requests, comprising the steps of:

comparing, in response to receiving a call request involving a network user attached to the node, the address of the involved user with prefixes appearing as entries in a table, each entry having an associated indicator the value of which indicates whether the CUG membership of users attached to the node and having addresses beginning with the prefix is ambiguous, each of those entries for which the associated indicator has a non-ambiguity-indicating value having an associated preprocessed CUG information block known to the node prior to receiving the call request;

determining the entry if any that best matches the address of the involved user;

for the entry if any that best matches the address of the involved user, determining whether the associated indicator has an ambiguity-indicating value;

if the indicator has the ambiguity-indicating value, performing the steps of:
  (i) comparing the address of the involved user with a list of CUG member rules known to the node in order to determine which if any of the member rules affect membership of the involved user in a CUG; and
  (ii) creating a CUG information block associated with the involved user and containing CUG identifiers of CUGs associated with the determined membership-affecting rules; and
creating a CUG list containing those CUG identifiers appearing in either the preprocessed CUG information block associated with the best-matching entry in the table, if the indicator has the non-ambiguity-indicating value, or appearing in the created CUG information block, if the indicator has the ambiguity-indicating value.

9. A method according to claim 8, wherein the involved user may be either a calling user whose address appears as a source address in a call ingress identifying another network user being called, or the involved user may be a called user whose address appears as a destination address in a call egress identifying another network user calling the involved user, and further comprising the steps of:
  (i) if the involved user is the calling user, performing the following steps:
    (a) constructing an outgoing call request message including as a destination address the address of the other network user being called and also including the created CUG list; and
    (b) transmitting the outgoing call request message onto the network; and
  (ii) if the involved user is the called user, performing the following steps:
    (a) comparing the CUG identifiers retrieved from the created CUG list to CUG identifiers appearing in a CUG list included in the call egress; and
    (b) if the comparison indicates that the involved user and the other network user are both members of at least one of the same CUGs, then forwarding the call egress to the involved user, and otherwise constructing and transmitting onto the network an outgoing call reply message including as a destination address the address of the other network user indicating that the call is rejected.

10. A method according to claim 8, wherein the best-match-determining step comprises the steps of:
  determining which if any entries match the address of the involved user;
  if only one entry matches the address, choosing the matching entry as the best-matching entry; and
  if multiple entries match the address, choosing the one matching entry, if any, containing more digits than the rest of the matching entries, and if there is no single longest entry then choosing from among the longest entries according to a criteria other than length.

11. A method of operating a node in a network having closed user groups (CUGs) of network users involved in call requests, comprising the steps of:
  determining, for each address or prefix entry appearing in an address/prefix table known to the node and characterizing the addresses of corresponding users attached to the node, whether user addresses characterized by the entry potentially satisfy any of a list of CUG member rules known to the node;
  determining whether each potentially-satisfied member rule is more specific than the entry characterizing the user addresses potentially satisfying the member rule;
  tagging as ambiguous those entries which any corresponding potentially-satisfied member rule is determined to be more specific than;
  for each entry which no corresponding potentially-satisfied member rule is determined to be more specific than, creating a preprocessed CUG information block associated with the entry and containing CUG identifiers identifying CUGs associated with such potentially-satisfied and not-more-specific member rules;
  comparing, in response to receiving a call request involving a user attached to the node, the address of the involved user with the entries in the address/prefix table to determine the entry that best matches the address of the involved user;
  if the entry best matching the address of the involved user is tagged as ambiguous, performing the steps of:
    (i) comparing the address of the involved user with the list of CUG member rules in order to determine which if any of the member rules affect membership of the involved user in a CUG; and
    (ii) creating a CUG information block associated with the involved user and containing CUG identifiers of CUGs associated with the determined membership-affecting rules; and
  creating a CUG list containing those CUG identifiers appearing in either the preprocessed CUG information block associated with the best-matching entry in the address/prefix table, if the entry is not tagged as ambiguous, or appearing in the created CUG information block, if the entry is tagged as ambiguous.

12. A method according to claim 11, wherein the satisfaction-determining step comprises the step of comparing corresponding digits of the member rule and of the entry beginning at the most significant digit position and proceeding toward the least significant position until either (i) corresponding digits do not match; (ii) a string wildcard character is encountered in the member rule; (iii) the entry runs out of digits; or (iv) the rule runs out of digits; the member rule being potentially satisfied if the comparison terminates due to either of conditions (ii) or (iii), and wherein the step of determining the relative specificity of the entry and the member rule comprises the step of determining whether the member rule ends in a string wildcard character or has additional digits beyond those matching the digits in the entry, in which case the member rule is determined to be more specific than the entry.

13. A method according to claim 11, wherein: (i) the network has other nodes to which other users are attached; (ii) there exists for the network a complete list of CUG member rules for all CUGs defined in the network, some of the member rules in the complete list potentially describing CUG membership of users attached to the node of claim 11, and others of the member rules in the complete list not describing CUG membership of any users attached to that node; and (iii) the list of CUG member rules known to the node of claim 11 is a subset of the complete list containing only those member rules potentially describing CUG membership of the users attached to that node.

14. A method according to claim 13, wherein the network has a network management station operable to create the subset of member rules from the complete list, and further comprising the step of receiving the created subset from the network management station.

15. A method according to claim 11, wherein the network has a network management station to which the list of CUG member rules is also known, and further comprising the step of receiving the list of CUG member rules from the network management station.

16. A method according to claim 11, wherein the involved user may be either a calling user whose address appears as a source address in a call ingress identifying another network user being called, or the involved user may be a called user whose address appears as a destination address in a call egress identifying another network user calling the involved user, and further comprising the steps of:

if the involved user is the calling user, performing the following steps:
  (i) constructing an outgoing call request message including as a destination address the address of the network user being called and also including the created CUG list; and
  (ii) transmitting the outgoing call request message onto the network; and if the involved user is the called user, performing the following steps:
  (i) comparing the CUG identifiers retrieved from the created CUG list to CUG identifiers appearing in a CUG list included in the call egress; and
  (ii) if the comparison indicates that the involved user and the other network user are both members of at least one of the same CUGs, then forwarding the call egress to the involved user, and otherwise constructing and transmitting onto the network an outgoing call reply message including as a destination address the address of the other network user and indicating that the call is rejected.

17. A method according to claim 11, wherein the best-match-determining step comprises the steps of:

determining which if any entries match the address of the involved user;

if only one entry matches the address, choosing the matching entry as the best-matching entry; and if multiple entries match the address, choosing the one matching entry, if any, containing more digits than the rest of the matching entries, and if there is no single longest entry then choosing from among the longest entries according to a criteria other than length.

18. A method of operating a node in a network having closed user groups (CUGs) of network users involved in call requests, comprising the steps of:

for each address or prefix entry appearing in an address/prefix table known to the node and characterizing the addresses of corresponding users attached to the node, comparing corresponding digits of the entry and each of a list of CUG member rules known to the node beginning at the most significant digit position and proceeding toward the least significant position until either (i) corresponding digits do not match; (ii) a string wildcard character is encountered in the member rule; (iii) the entry runs out of digits; or (iv) the rule runs out of digits, the member rule being potentially satisfied by the entry if the comparison terminates due to either of conditions (ii) or (iii);

determining whether each potentially-satisfied member rule either ends in a string wildcard character or has additional digits beyond those matching the digits in the entry, in which case the member rule is determined to be more specific than the entry;

tagging as ambiguous those entries which any corresponding potentially-satisfied member rule is determined to be more specific than;

for each entry which no corresponding potentially-satisfied member rule is determined to be more specific than, creating a preprocessed CUG information block associated with the entry and containing CUG identifiers identifying CUGs associated with such potentially-satisfied and not-more-specific member rules;

in response to receiving a call request involving an attached user being either a calling user whose address appears as a source address in a call ingress identifying another network user being called or being a called user whose address appears as a destination address in a call egress identifying another network user calling the involved user, performing the steps of:
  (i) comparing the address of the involved user with the entries in the address/prefix table to determine which entries match the address of the involved user;
  (ii) selecting as the best-matching entry the entry that either matches the address, if only one entry matches the address, or that contains more digits than the rest of the matching entries, if multiple entries match the address, or that satisfies a criteria other than the number of matching digits, if two or more matching entries contain equal numbers of digits and contain more digits than the rest of the matching entries;
  (iii) if the entry best matching the address of the involved user is tagged as ambiguous, performing the steps of:
    (a) comparing the address of the involved user with the list of CUG member rules in order to determine which if any of the member rules affect membership of the involved user in a CUG; and
    (b) creating a CUG information block associated with the involved user and containing CUG identifiers of CUGs associated with the determined membership-affecting rules;
  (iv) creating a CUG list containing those CUG identifiers appearing in either the preprocessed CUG information block associated with the best-matching entry in the address/prefix table, if the entry is not tagged as ambiguous, or appearing in the created CUG information block, if the entry is tagged as ambiguous;
  (v) if the involved user is the calling user, performing the steps of:
    (a) constructing an outgoing call request message including as a destination address the address of the network user being called and also including the created CUG list; and
    (b) transmitting the outgoing call request message onto the network; and
  (vi) if the involved user is the called user, performing the steps of:
    (a) comparing the CUG identifiers retrieved from the created CUG list to CUG identifiers appearing in a CUG list included in the call egress; and
    (b) if the comparison indicates that the involved user and the other network user are both members of at least one of the same CUGs, then forwarding the call egress to the involved user, and otherwise constructing and transmitting onto the network an outgoing call reply message including as a destination address the address of the other network user and indicating that the call is rejected.

19. A method according to claim 18, wherein: (i) the network has other nodes to which other users are attached; (ii) there exists for the network a complete list of CUG member rules for all CUGs defined in the network, some of the member rules in the complete list potentially describing CUG membership of users attached to the node of claim 18, and others of the member rules in the complete list describing CUG membership of users attached to other nodes and not describing CUG membership of any users attached to the node of claim 18; and (iii) the list of CUG member rules known to the node of claim 18 is a subset of the complete list, the subset containing the member rules potentially describing CUG membership of the users attached to the node of claim 18 and not containing any of the other member rules.

20. A method according to claim 19, wherein the network has a network management station operable to create the subset of member rules from the complete list, and further comprising the step of receiving the created subset from the network management station.

21. A method according to claim 18, wherein the network has a network management station to which the list of CUG member rules is also known, and further comprising the step of receiving the list of CUG member rules from the network management station.

* * * * *